(12) United States Patent
Kano

(10) Patent No.: US 7,150,088 B2
(45) Date of Patent: Dec. 19, 2006

(54) METHOD OF MANUFACTURING TORSIONAL DAMPER

(75) Inventor: Tsutomu Kano, Tottori (JP)

(73) Assignee: NOK Corporation, Tokyo (JP)

( * ) Notice: Subject to any disclaimer, the term of this patent is extended or adjusted under 35 U.S.C. 154(b) by 151 days.

(21) Appl. No.: 10/508,624

(22) PCT Filed: Oct. 16, 2003

(86) PCT No.: PCT/JP03/13264

§ 371 (c)(1),
(2), (4) Date: Sep. 21, 2004

(87) PCT Pub. No.: WO2004/065820

PCT Pub. Date: Aug. 5, 2004

(65) Prior Publication Data

US 2005/0160572 A1   Jul. 28, 2005

(30) Foreign Application Priority Data

Jan. 24, 2003  (JP) ............................... 2003-15480

(51) Int. Cl.
*B23P 25/00*  (2006.01)
*B23P 11/02*  (2006.01)
*B23P 11/00*  (2006.01)

(52) U.S. Cl. .............................. 29/458; 29/451; 29/428

(58) Field of Classification Search .................. 29/458, 29/457, 428, 460, 451, 446, 450, 280, 235, 29/282; 301/6.91; 188/378, 379

See application file for complete search history.

(56) References Cited

FOREIGN PATENT DOCUMENTS

JP           2001-027287        1/2001

*Primary Examiner*—John C. Hong
(74) *Attorney, Agent, or Firm*—Jacobson Holman PLLC

(57) ABSTRACT

In order to increase a sliding torque between a hub (1), an annular rubber (2) and an annular mass (3) without increasing a pressure inserting load at a time of assembling a torsional damper, a silane coupling agent is applied to an outer peripheral surface (1*a*) of the hub (1) and an inner peripheral surface (2*a*) of the annular mass (2) arranged outside the hub (1), or inner and outer peripheral surfaces (3*a*, 3*b*) of the annular rubber (3) to be pressure inserted between the peripheral surfaces (1*a*, 2*a*) by a spray or dipping method, thereafter applying a lubricating fluid thereto by a spray or dipping method, and pressure inserting the annular rubber (3) between the peripheral surfaces (1*a*, 2*a*).

1 Claim, 2 Drawing Sheets

METHOD OF MANUFACTURING TORSIONAL DAMPER

This is a nationalization of PCT/JP03/13264 filed Oct. 16, 2003 and published in Japanese.

TECHNICAL FIELD

The present invention relates to a manufacturing technique of a torsional damper absorbing a torsional vibration generated in a rotating shaft, for example, a crank shaft of an engine or the like.

BACKGROUND ART

A torsional damper for absorbing a torsional vibration (a vibration in a rotational direction) generated in a crank shaft of an internal combustion engine of a vehicle in accordance with a rotation is provided with a structure in which a metal annular mass is coaxially and elastically connected to an outer periphery of a metal hub fixed to a crank shaft via an annular rubber, and lowers the torsional vibration in a specific rotating speed range on the basis of a dynamic vibration absorbing effect caused by a resonance in a torsional direction. The torsional damper includes a so-called fitting type torsional damper, and this type of torsional damper is manufactured by pressure inserting and fitting a rubber formed in an annular shape into a portion between opposing peripheral surfaces of the hub and the annular mass from one side in an axial direction.

Since the fitting type torsional damper is structured such that the hub, the annular rubber and the annular mass are connected to each other only on the basis of a frictional resistance caused by a compression reaction force of the rubber at a time of being pressure inserted, there is a risk that a slip in a circumferential direction is generated between the fitting surfaces of the hub or the annular mass and the annular rubber at a time when an input torque is increased. Accordingly, in order to prevent the slip mentioned above from being generated, it is necessary to improve a sliding torque between the hub, the annular rubber and the annular mass.

As a typical conventional art for improving the sliding torque between the hub, the annular rubber and the annular mass in the fitting type torsional damper, Japanese Patent Unexamined Patent Publication No. 2001-27287 describes a structure in which a silane coupling agent is applied to the opposing peripheral surfaces between the hub and the annular mass or the annular rubber at a time of pressure inserting the annular rubber to the portion between the opposing peripheral surfaces of the hub and the annular mass arranged in the outer peripheral side of the hub. In other words, the silane coupling agent interposed in the fitting surface between the hub and the annular mass or the annular rubber achieves a significant effect for increasing the sliding torque.

However, in accordance with the conventional art mentioned above, since the silane coupling agent dries quickly, the silane coupling agent applied to the opposing surfaces of the hub and the annular mass, or the annular rubber pressure fitted to the portion between the opposing surfaces dries in a short time. Accordingly, there is pointed out a problem that a pressure inserting load is increased on the basis of an increase of a frictional resistance with the hub and the annular mass, due to generation of an adhesive property of the silane coupling agent at a time of pressure inserting the annular rubber. Further, a swelling deformation on the basis of an internal stress is generated in the annular rubber during a pressure inserting process, by the increase of the pressure inserting load, whereby a durability of the annular rubber is lowered, and a accuracy of oscillation in an axial direction of the annular mass is deteriorated, so that there is a risk that an oscillating motion of the annular mass during the rotation is increased.

The present invention is made by taking the problem mentioned above into consideration, and a technical object of the present invention is to increase a sliding torque between a hub, an annular rubber and an annular mass without increasing a pressure inserting load at a time of pressure inserting the annular rubber to a portion between opposing peripheral surfaces of the hub and the annular mass.

DISCLOSURE OF THE INVENTION

As a means for effectively solving the conventional technical problem, in accordance with a first aspect of the present invention, there is provided a manufacturing method of a torsional damper comprising the steps of:

applying a coupling agent to opposing peripheral surfaces of a hub made of metal and an annular mass arranged in an outer peripheral side of the hub and made of metal, or an annular rubber pressure inserted to a portion between the opposing peripheral surfaces;

thereafter applying a lubricating fluid thereto; and pressure inserting and fitting the annular rubber to the portion between the opposing peripheral surfaces.

In accordance with the structure mentioned above, a load at a time of pressure inserting the annular rubber is lowered in comparison with a case of pressure inserting the annular rubber without applying the lubricating fluid after applying the silane coupling agent to the fitting surface, and the load can be further lowered in comparison with a case of pressure inserting the annular rubber by applying the lubricating fluid without applying the silane coupling agent to the fitting surface.

In this case, the coupling agent has a function of increasing a frictional force between the rubber and the metal, that is, making the hub, and the annular mass and the annular rubber in a firmly fitted state to each other so as to effectively prevent a slip in a circumferential direction from being generated between the fitting surfaces of the hub or the annular mass and the annular rubber. The coupling agents which can be employed are, for example, an amine group silane coupling agent (a silane coupling agent containing an amino group) described in the patent document 1 previously referred, an urethane group silane coupling agent (a silane coupling agent containing an isocyanate group), the other silane coupling agents, an amino denatured sililated polymer corresponding to derivatives obtained by denaturing them, a sililated amino polymer, an unsaturated amino silane complex, a block isocyanate silane, a phenyl amino long-chain alkyl silane, an amino sililated silicone, a sililated polyester and the like.

The lubricating fluid is used for achieving a lubrication at a time of pressure inserting the annular rubber to the portion between the opposing peripheral surfaces of the hub and the annular mass, and those which can be employed are an aromatic hydrocarbon compound, a plasticizing agent, a softening agent and the like. The aromatic hydrocarbon compound is used, for example, as a solvent for a dry cleaning, various diluting agents, and an industrial aerosol, and the plasticizing agent and the softening agent are used as an additive agent to a rubber material for improving a workability of the rubber. As the plasticizing agent, phthalic acid derivatives or the like can be used, and as the softening agent, for example, a paraffin group softening agent can be used. Further, only one kind of these lubricating fluids may be selected, however, a mixture of two or more kinds may be used.

BEST MODE FOR CARRYING OUT THE INVENTION

Figure 1:
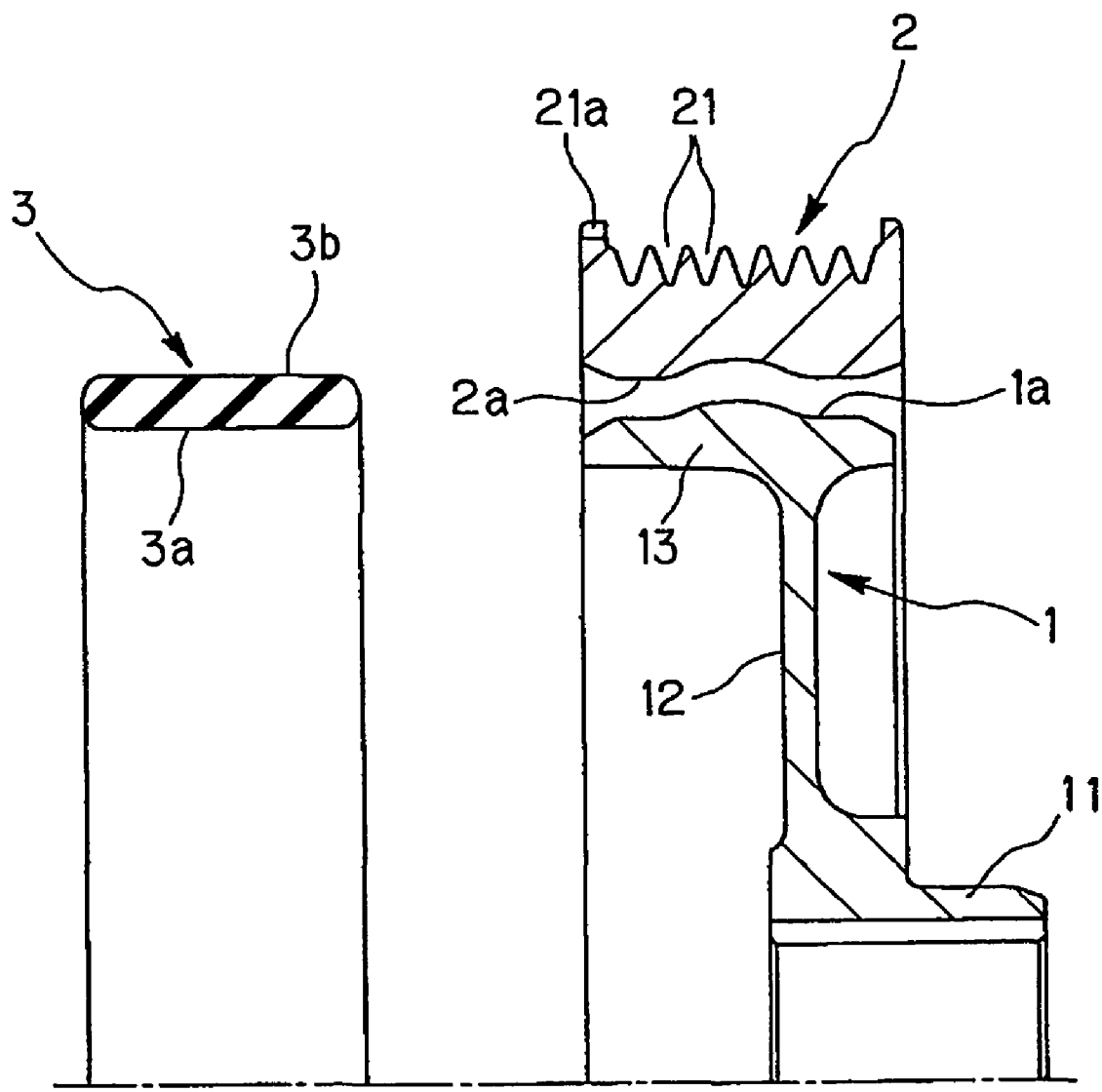
FIG. 1 is a half sectional view showing a manufacturing method of a torsional damper in accordance with the present invention by cutting along a plane passing through an axis.
Figure 2:
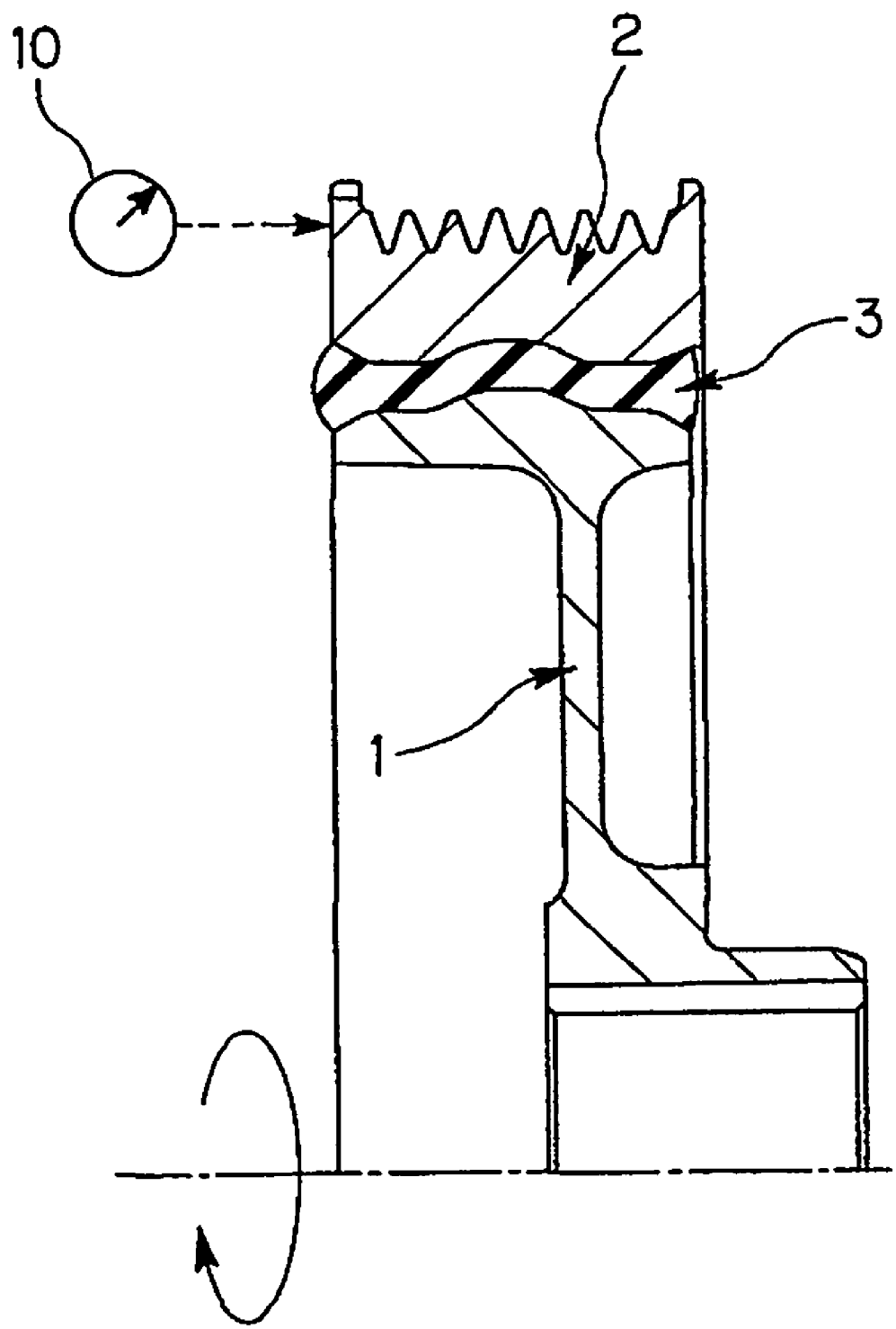
FIG. 2 is a schematic view showing a half section obtained by cutting the manufactured torsional damper along the plane passing through the axis thereof and a method of measuring an accuracy of oscillation in an axial direction of an annular mass thereof.

FIG. 1 is a half sectional view showing a manufacturing method of a torsional damper in accordance with the present invention by cutting along a plane passing through an axis of a hub, and FIG. 2 is a schematic view showing a half section obtained by cutting the manufactured torsional damper along the plane passing through the axis thereof and a method of measuring an accuracy of oscillation in an axial direction of an annular mass thereof. In particular, in FIG. 1, reference numeral 1 denotes a hub mounted to an axial end of a crank shaft of an internal combustion engine (not shown), reference numeral 2 denotes an annular mass concentrically arranged in an outer peripheral side of the hub 1 apart from the hub, and reference numeral 3 denotes an annular rubber pressure inserted and fitted to a portion between opposing peripheral surfaces of the hub 1 and the annular mass 2 from one side in an axial direction.

The hub 1 is casted with a metal material, and has an inner peripheral side boss portion 11 mounted to the axial end of the crank shaft, a disc portion 12 expanded to an outer peripheral side therefrom, and a rim portion 13 formed in an outer peripheral portion thereof. The annular mass 2 is also casted with a metal material, and is arranged in an outer peripheral side of the rim portion 13. A pulley portion 21 for transmitting a rotating force of the crank shaft to various auxiliary machines via a V belt (not shown) is formed in an outer peripheral surface of the annular mass 2, and a timing mark groove 21a corresponding to a detected portion of a crank angle for controlling an ignition timing or the like is formed in one position in a circumferential direction of one end in an axial direction of the pulley portion 21. The annular rubber 3 is vulcanized and formed in an annular shape with a rubber-like elastic material.

An outer peripheral surface 1a of the hub 1 (the rim portion 13) and an inner peripheral surface 2a of the annular mass 2 opposing thereto in a diametrical direction are formed in a gently undulated shape in a diametrical direction in correspondence to each other in the illustrated section. Further, a coupling agent is applied to the opposing peripheral surfaces 1a and 2a without previously processing a face to be rough in accordance with a chemical surface treatment such as a bonderizing treatment or the like, and the opposing peripheral surfaces 1a and 2a are dried. As a method of application, there can be employed a method of spraying a coupling agent to the outer peripheral surface 1a of the hub 1 and the inner peripheral surface 2a of the annular mass 2, and a method of dipping the hub 1 and the annular mass 2 in a liquid tank filled with the coupling agent. As the coupling agent, it is possible to preferably use a coupling agent obtained by diluting the silane coupling agent described previously by, for example, an ethanol water solution or the other alcohol water solution.

Further, the coupling agent may be applied to an inner peripheral surface 3a and an outer peripheral surface 3b of the annular rubber 3 forming fitting surfaces with the outer peripheral surface 1a of the hub 1 and the inner peripheral surface 2a of the annular mass 2. As a method of application in this case, it is possible to employ a method in accordance with a spray application and a method of dipping in the liquid tank filled with the coupling agent.

Next, the annular rubber 3 is pressure inserted to a portion between the outer peripheral surface 1a of the hub 1 and the inner peripheral surface 2a of the annular mass 2 from one side in an axial direction after a lubricating fluid is applied either to the outer peripheral surface 1a of the hub 1 and the inner peripheral surface 2a of the annular mass 2, or to the inner peripheral surface 3a and the outer peripheral surface 3b of the annular rubber 3 whichever the coupling agent is not applied, for example. At this time, since the coupling agent is dried, a pressure inserting resistance by adhesion is not generated, and a pressure inserting load caused by a frictional resistance between the inner peripheral surface 3a and the outer peripheral surface 3b of the annular rubber 3, and the outer peripheral surface 1a of the hub 1 and the inner peripheral surface 2a of the annular mass 2 is significantly lowered in comparison with a case that the lubricating fluid is not applied. Accordingly, it is possible to easily execute pressure inserting work. Further, surprisingly enough, the pressure inserting load becomes further smaller in comparison with a case that the lubricating fluid is applied without applying the silane coupling agent, as is understood from results of measurement mentioned below.

In this case, as the lubricating fluid, it is possible to employ the aromatic hydrocarbon compound, the plasticizing agent, the softening agent and the like which are described previously. Since these materials tend to be absorbed in the rubber material, and have proper volatility, they tend to be removed from the fitting surface on the basis of the absorption and the volatility, can be easily removed by cleaning, have good compatibility with the silane coupling agent, and do not cause any damage to the rubber material. Accordingly, these materials are preferable. Further, since the silane coupling agent dries quickly, it is possible to apply the lubricating fluid to the surface where silane coupling agent has been applied, after drying.

In this case, after pressure inserting and fitting the annular rubber 3, the lubricating fluid left in the fitting surface is removed by a cleaning agent or the like as occasion demands.

The torsional damper manufactured in accordance with this manner is structured, as shown in FIG. 2, such that the hub 1 and the annular mass 2 are elastically connected to each other via the annular rubber 3, and the silane coupling agent (not shown) is interposed in the fitting surfaces between the annular rubber 3, and the hub 1 and the annular mass 2. Since the outer peripheral surface 1a of the hub 1 and the inner peripheral surface 2a of the annular mass 2 are formed in a gently undulated shape in a diametrical direction in correspondence to each other, the annular rubber 3 is also formed in a warped shape being profiled by those surfaces. Accordingly, it is possible to effectively prevent the annular mass 2 from falling away in an axial direction.

In the pressure inserting step mentioned above, as a result that the pressure inserting load is lowered by applying the lubricating fluid, and the swelling deformation of the annular rubber 3 and the generation of the internal residual stress can be inhibited, the torsional damper is widely improved in durability of the annular rubber 3 and an accuracy of oscillation in an axial direction of the annular mass 2 at a time of rotating. Further, since the lubricating fluid applied at a time of pressure inserting is removed, whereby a sliding torque in the fitting surface between the hub 1 and the annular rubber 3 and the fitting surface between the annular mass 2 and the annular rubber 3 is significantly increased by the silane coupling agent without forming the outer peripheral surface 1a of the hub 1 and the inner peripheral surface 2a of the annular mass 2 which correspond to the fitting surface of the annular rubber 3, to be rough faces in accordance with a chemical surface treatment such as a bonderizing treatment or the like, it is possible to effectively prevent the slip in the circumferential direction from being generated between the fitting surfaces of the hub 1 or the annular mass 2 and the annular rubber 3 at a time of inputting a great torque generated by a dynamic vibration absorbing operation or the like.

The following Table 1 shows results obtained by measuring a pressure inserting load at a time of pressure inserting the annular rubber 3, and an accuracy of oscillation in the axial direction of the annular mass 2 of the torsional damper after being manufactured, in order to verifying an effect obtained by the manufacturing method in accordance with the present invention. In this case, the torsion damper provided for the measurement is formed in a cross sectional shape shown in FIG. 1, and the accuracy of oscillation in the axial direction is obtained by rotating the torsional damper around an axis O and measuring an amount of displacement in the axial direction of one end surface of the annular mass 2 in accordance with this rotation by a position sensor 10, as shown in FIG. 2.

|  | Silane coupling agent | Lubricating fluid | Pressure inserting load | Accuracy of oscillation in axial direction |
| --- | --- | --- | --- | --- |
| Comparative embodiment 1 | not applied | applied | 25 kN | 0.25 |
| Comparative embodiment 2 | applied | not applied | 28 kN | 0.33 |
| Comparative embodiment 1 | applied to metal side | applied to metal side | 23 kN | 0.22 |
| Comparative embodiment 2 | applied to metal side | applied top rubber side | 22 kN | 0.21 |
| Comparative embodiment 3 | applied to rubber side | applied to metal side | 23 kN | 0.22 |
| Comparative embodiment 4 | applied to rubber side | applied to rubber side | 23 kN | 0.22 |

As is apparent from the results of measurement mentioned above, in the embodiments 1 to 4 in which the lubricating fluid is applied at a time of pressure inserting the annular rubber after applying the silane coupling agent to the fitting surface, the pressure inserting load and the accuracy of oscillation in the axial direction are improved not only in comparison with the comparative embodiment 2 in which the annular rubber is pressure fitted without applying the lubricating fluid, after applying the silane coupling agent to the fitting surface, but also in comparison with the comparative embodiment 1 in which the lubricating fluid is applied at a time of pressure inserting the annular rubber without applying the silane coupling agent to the fitting surface.

INDUSTRIAL APPLICABILITY

In accordance with the manufacturing method of the torsional damper on the basis of the invention stated in the first aspect of the present invention, since the annular rubber is pressure inserted and fitted to the portion between the hub and the annular mass after the coupling agent is applied to the fitting surfaces between the hub and the annular mass made of the metal and the annular rubber and thereafter the lubricating fluid is applied, the load at a time of pressure inserting the annular rubber is lowered in comparison with a case of pressure inserting the annular rubber without applying the lubricating fluid after applying the silane coupling agent to the fitting surfaces, and the load is lowered in comparison with a case of pressure inserting the annular rubber by applying the lubricating fluid without applying the silane coupling agent to the fitting surfaces. Accordingly, not only the pressure inserting work of the annular rubber is easily executed, but also the swelling deformation of the annular rubber and the generation of the internal residual stress during the pressure inserting step can be inhibited, and it is possible to widely improve the durability of the annular rubber and the accuracy of oscillation in the axial direction of the annular mass.

What is claimed is:

1. A method for manufacturing a torsional damper wherein an annular rubber is press-fitted into a given opposing peripheral surface clearance defined between a hub made of metal and an annular mass arranged in an outlet peripheral side of the hub and made of metal, comprising the steps of:
    applying a silane coupling agent to either an outer peripheral surface of said and an inner peripheral surface of said annular mass or an inner peripheral surface and an outer peripheral surface of said annular rubber and drying said silane coupling agent;
    applying a lubricating fluid to the inner peripheral surface and the outer peripheral surface of said annular rubber, when said silane coupling agent is applied to the outer peripheral surface of said hub and the inner peripheral surface of said annular mass, or applying the lubricating fluid to the outer peripheral surface of said hub and the inner peripheral surface of said annular mass, when said silane coupling agent is applied to the inner peripheral surface and the outer peripheral surface of said annular rubber; and
    press-fitting the annular rubber into said opposing peripheral surface clearance along an axial direction.

* * * * *